United States Patent
Wang

(10) Patent No.: US 6,283,841 B1
(45) Date of Patent: Sep. 4, 2001

(54) SANDER HAVING ADJUSTABLE SANDER MEMBER

(76) Inventor: Tian Wang Wang, No. 45, Yi Chang East Road, 411 Taiping City, Taichung Hsien (TW)

( * ) Notice: Subject to any disclaimer, the term of this patent is extended or adjusted under 35 U.S.C. 154(b) by 0 days.

(21) Appl. No.: 09/556,159

(22) Filed: Apr. 21, 2000

(51) Int. Cl.$^7$ .................................................. B24B 21/00
(52) U.S. Cl. ........................ 451/296; 451/360; 451/361
(58) Field of Search ................................ 451/12, 13, 23, 451/178, 296, 177, 179, 182, 360, 304, 355, 361

(56) References Cited

U.S. PATENT DOCUMENTS

| | | | |
|---|---|---|---|
| 4,346,536 | * 8/1982 | Bryden | 451/296 |
| 4,628,641 | * 12/1986 | Lazzari | 451/304 |
| 4,939,870 | * 7/1990 | Wang | 451/296 |
| 5,476,409 | * 12/1995 | Wada et al. | 451/296 |

* cited by examiner

Primary Examiner—Derris H. Banks
(74) Attorney, Agent, or Firm—Charles E. Baxley, Esq.

(57) ABSTRACT

A sander includes a base having a platform for supporting a work piece. A casing is rotatably secured to the base at a pivot shaft and has a plate for supporting a sander member. A lock device may secure the casing and the sander member to the base at any selected angular positions. The casing has two rotatable barrels for supporting the sander member. A motor is secured to the casing and secured to one of the barrels for driving the sander member via the barrels. The barrels may be adjusted relative to each other to tighten the sander member.

11 Claims, 6 Drawing Sheets

SANDER HAVING ADJUSTABLE SANDER MEMBER

BACKGROUND OF THE INVENTION

1. Field of the Invention

The present invention relates to a sander, and more particularly to a sander having an adjustable sander member.

2. Description of the Prior Art

Typical sanders comprise one or more sander members rotatably secured in a housing and may not be adjusted relative to the housing, particularly may not be adjusted relative to the housing to various angular positions.

The present invention has arisen to mitigate and/or obviate the afore-described disadvantages of the conventional sanders.

SUMMARY OF THE INVENTION

The primary objective of the present invention is to provide a sander having a sander member adjustable to various angular positions for facilitating the sanding operation to the work pieces.

In accordance with one aspect of the invention, there is provided a sander comprising a base including a platform secured thereon for supporting a work piece, a casing rotatably secured to the base at a pivot shaft, a sander member engaged on the casing and rotatable in concert with the casing about the pivot shaft for sanding the work piece, and means for securing the casing to the base at selected angular positions. The sander member may be rotated and adjusted relative to the platform at any selected angular position, and may be rotated and adjusted relative to the platform between a vertical position relative to the platform and a horizontal position parallel to or flush with the platform for allowing the work piece to be easily machined by the sander member.

The casing includes a plate extended therefrom and having a curved slot formed therein, the securing means includes a lock device engaged through the curved slot of the plate to lock the plate to the base. The lock device includes a pole extended from the base and slidably received in the curved slot of the plate, and a cam device pivotally secured to the pole and engaged with the plate for securing the plate to the base at any selected angular position.

The casing includes a first barrel and a second barrel rotatably secured thereon, the sander member is engaged around the first and the second barrels. A driving device is further provided for driving the sander member and includes a motor secured to the plate and having a spindle secured to the first barrel, such that the sander member may be driven by the motor via the barrels. A table is further secured to the motor and provided beside the first barrel for supporting the work piece to be machined by the sander member that is engaged over the first barrel.

The casing includes a support for rotatably supporting the second barrel. A device is further provided for moving the support and the second barrel relative to the casing to tighten and to release the sander member.

A stop is further secured to the casing and engaged over the sander member for engaging with the work piece and for allowing the work piece to be easily machined by the sander member. A cover is secured to the casing for shielding the first and the second barrels. A cap is detachably secured to the cover for shielding the first barrel and the sander member. A lid is rotatably secured to the cap for shielding the first barrel. The cap may include a port coupled to a vacuum device which may be used for drawing and collecting the dirt and the sanded materials removed from the work piece by the sander member.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
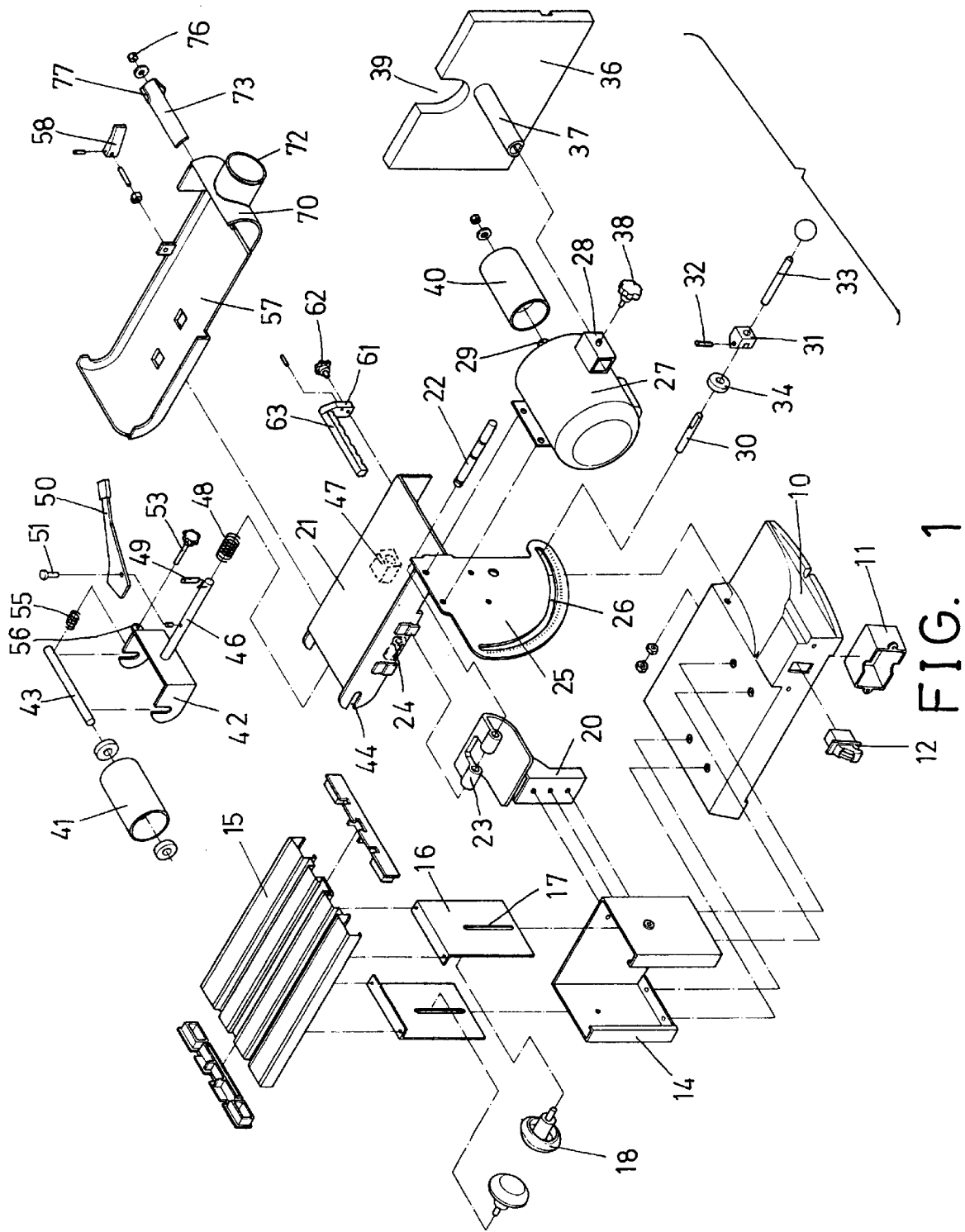
FIG. 1 is an exploded view of a sander in accordance with the present invention.
Figure 2:
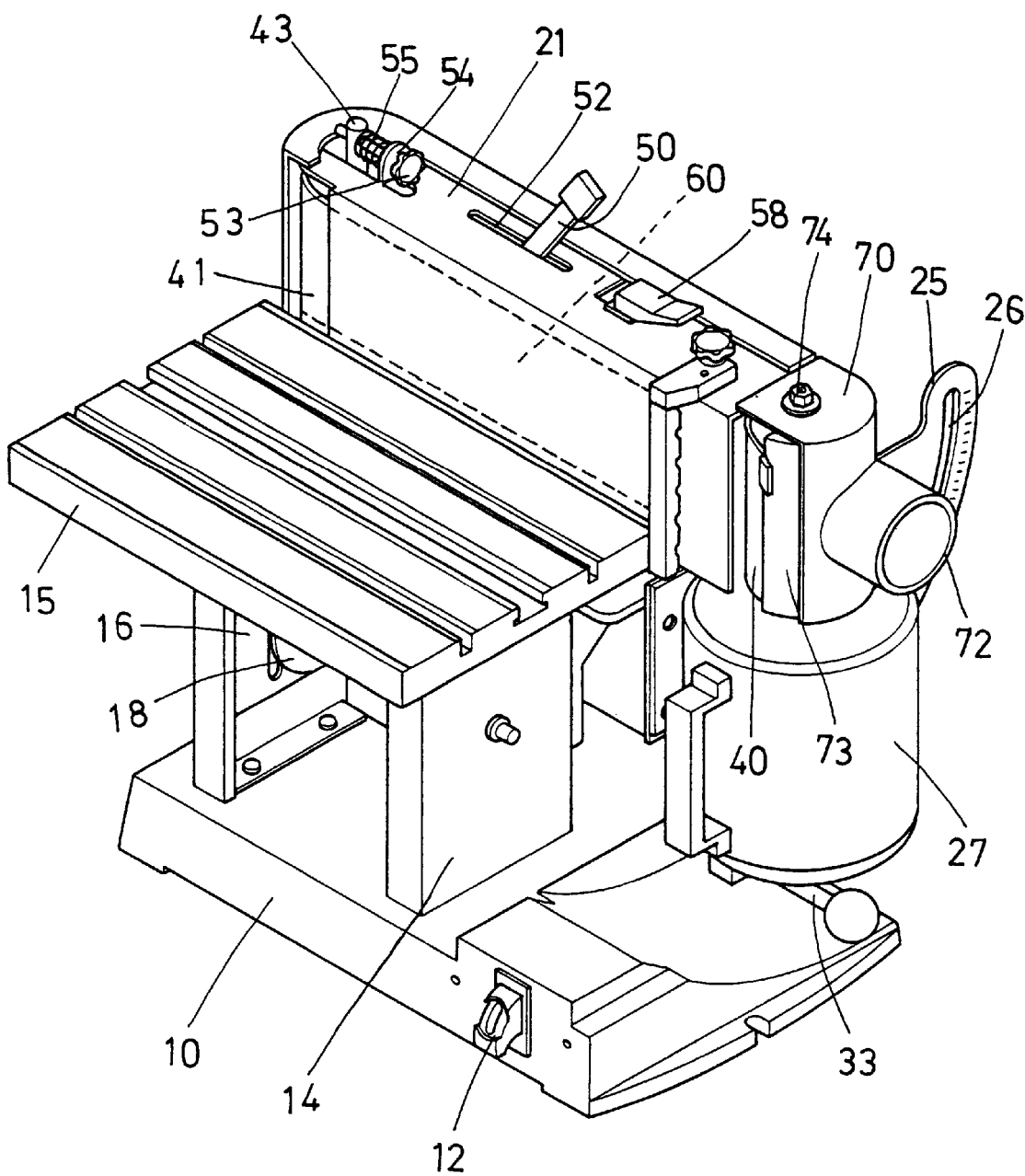
FIG. 2 is a front perspective view of the sander.
Figure 4:
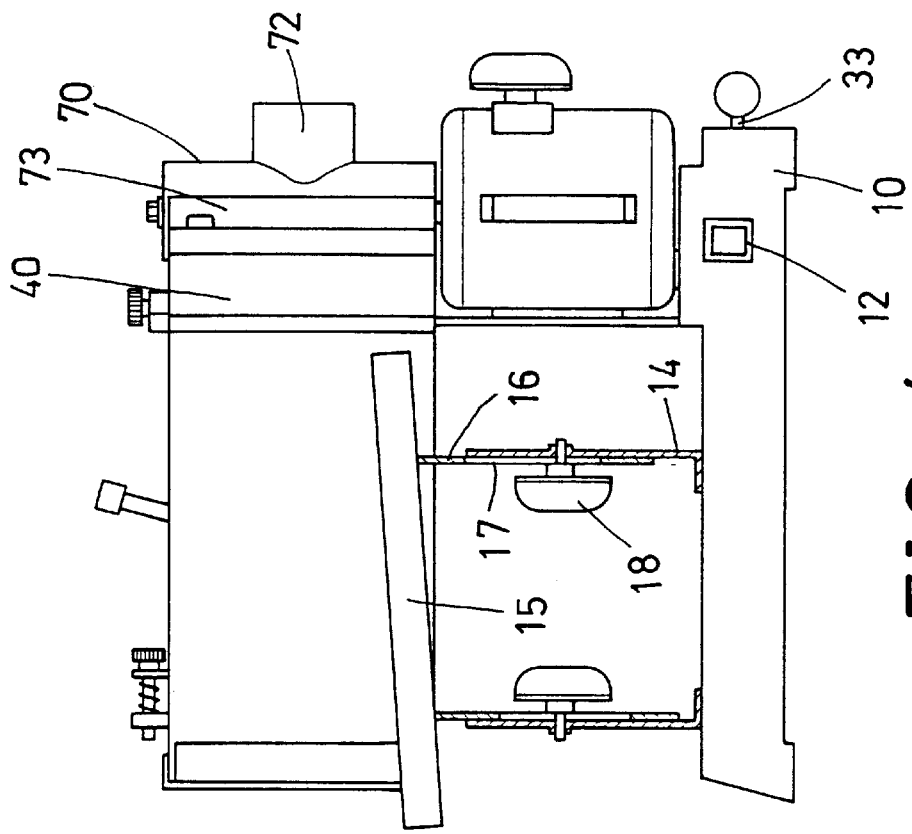
FIG. 4 is a front view of the sander, similar to FIG. 3, illustrating the operation of the sander.
Figure 3:
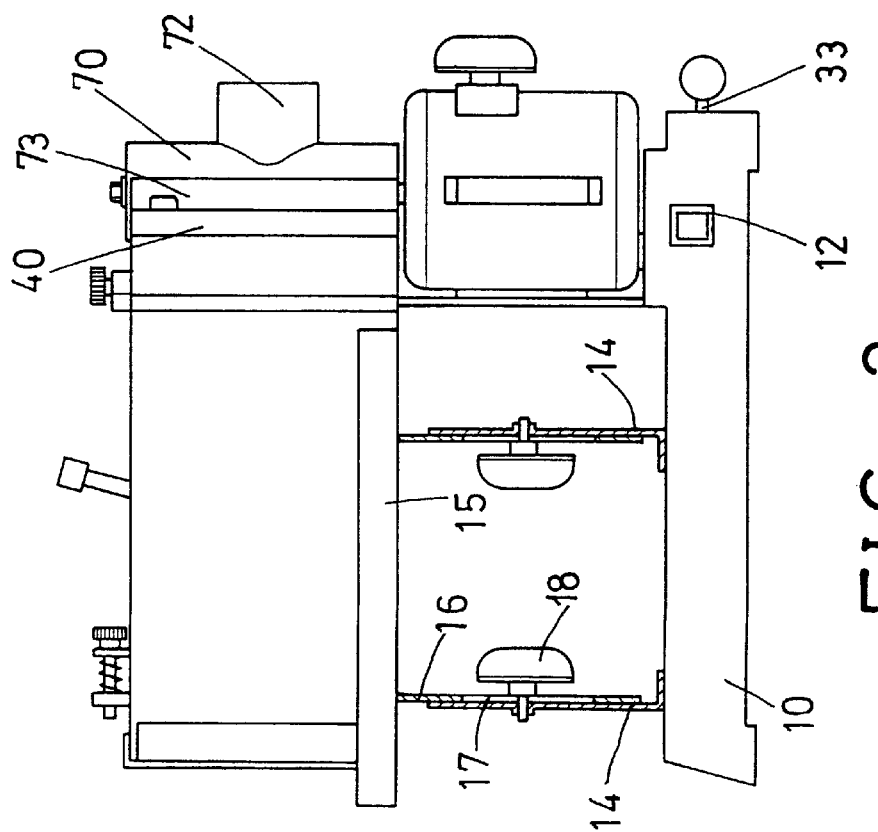
FIG. 3 is a front view of the sander.

Referring to the drawings, and initially to FIGS. 1–3, a sander in accordance with the present invention comprises a base 10 including a switch box 11 disposed therein and including a switch 12 attached thereto for controlling the operation of the sander. The base 10 includes a housing 14 secured on top thereof, and includes a pair of panels 16 secured to the bottom of a platform 15 and slidably received in and adjustable relative to the housing 14. The panels 16 each includes an oblong hole 17 formed therein for slidably receiving a fastener 18 which may secure the platform 15 at different heights or angular positions relative to the housing 14 (FIGS. 3, 4). The housing 14 includes a bracket 20 secured thereto and having one or more sleeves 23 provided therein.

Figure 7:
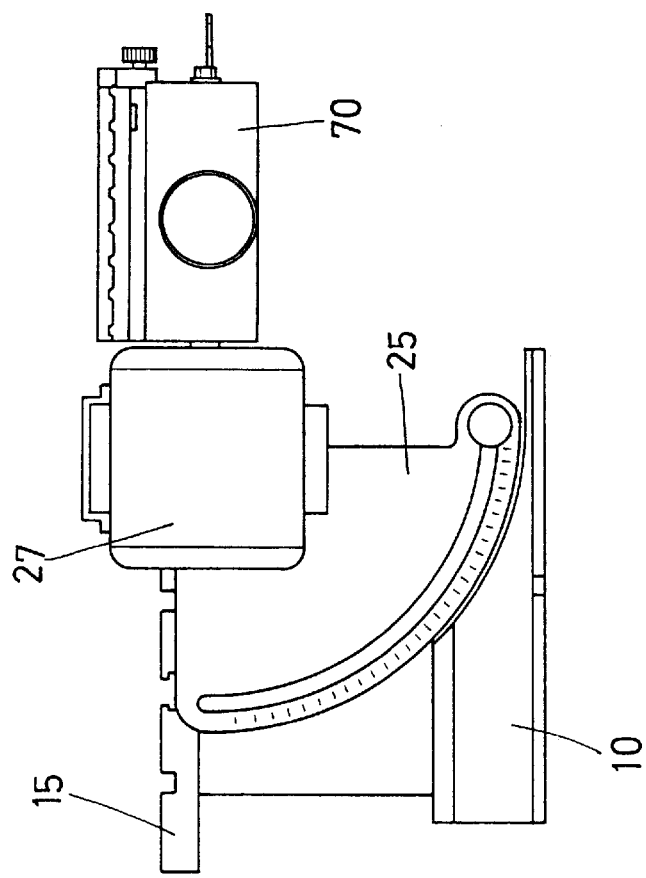
FIGS. 6 and 7 are side views illustrating the operation of the sander.
Figure 6:
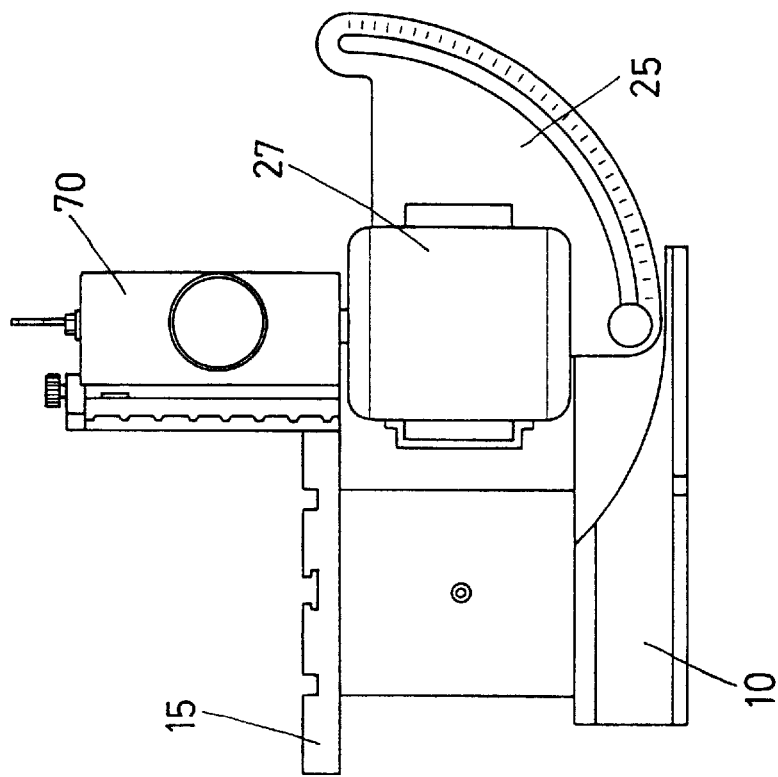

A casing 21 is rotatably secured to the housing 14 at a pivot shaft 22 which is engaged through a sleeve 24 of the casing 21 and engaged through the sleeves 23 of the bracket 20 of the housing 14, such that the casing 21 may be rotated relative to the housing 14 about the pivot shaft 22. The casing 21 includes a plate 25 extended therefrom and perpendicular to the pivot shaft 22 and having a curved slot 26 formed therein. A motor 27 is secured to the plate 25 by such as fasteners and includes a hub 28 provided thereon for receiving a post 37 that is extended from a table 36 which may be secured to the hub 28 of the motor 27 with the fastener 38. A barrel 40 is secured to the spindle 29 of the motor 27 and driven by the motor 27. The table 36 includes an opening 39 formed therein for receiving the barrel 40. A pole 30 is secured to the base 10 and slidably received in the curves slot 26 of the plate 25. A cam 31 is pivotally secured to the pole 30 at a pivot pin 32, and a lever 33 is secured to the cam 31 for rotating the cam 31 and for actuating the cam 31 to lock the plate 25 to the base 10 and for securing the plate 25 and the casing 21 to the base 10 and the housing 14 at the selected angular positions (FIGS. 6, 7). A gasket 34 may be engaged on the pole 30 and engaged between the plate 25 and the cam 31.

Figure 5:
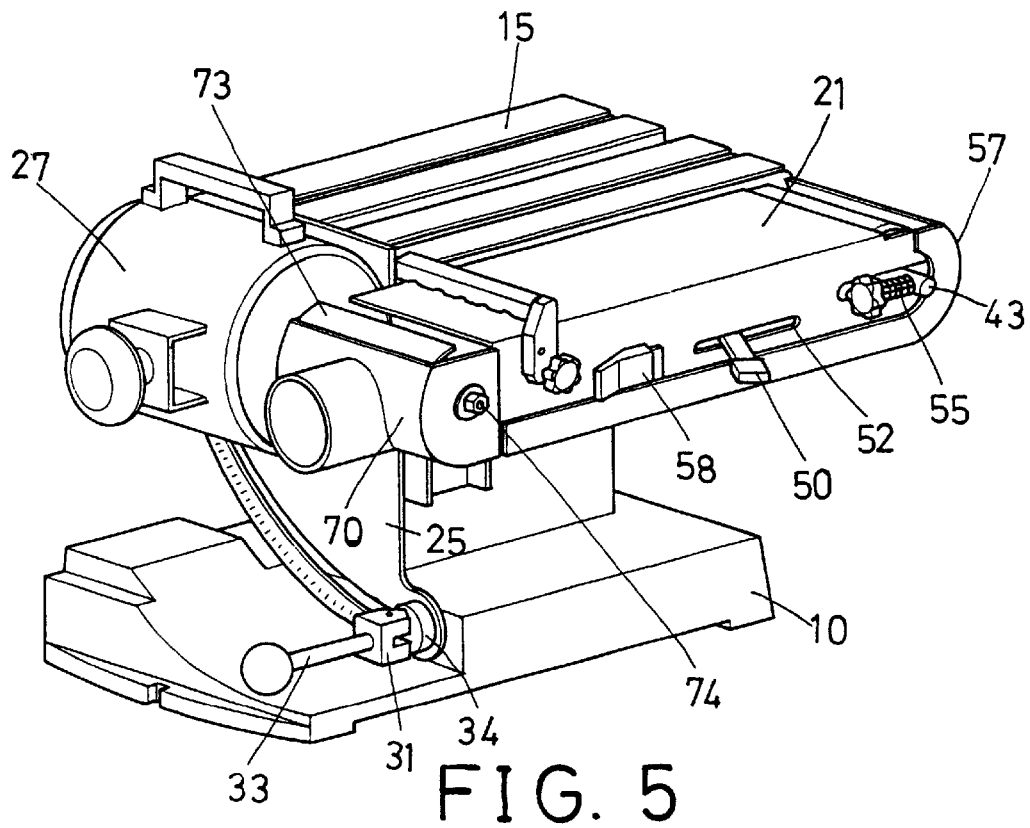
FIG. 5 is a rear perspective view of the sander, in which the sander device has been rotated to a lay down position.
Figure 8:
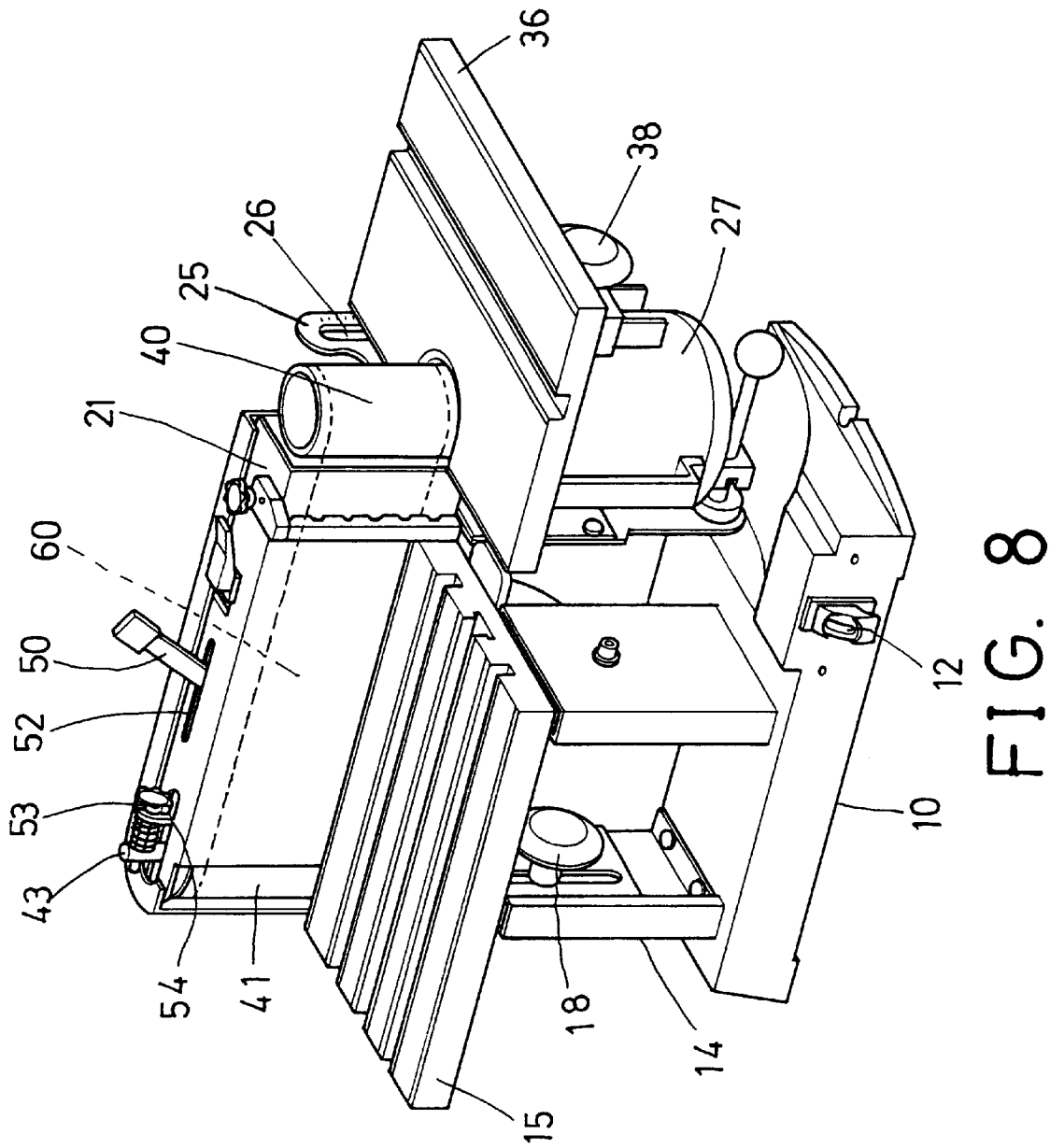
FIG. 8 is a front perspective view illustrating the application of the sander.

Another barrel 41 is rotatably secured in a support 42 at a pivot axle 43 which has two ends slidably engaged through a pair of grooves 44 of the casing 21. The support 42 includes an extension 46 slidably engaged through an ear 47 of the casing 21. A stud 49 is secured on the free end of the extension 46 and is engageable with the ear 47 of the casing 21 for preventing the support 42 from being disengaged from the casing 21. A handle 50 is pivotally secured to the extension 46 at a pivot rod 51 and is slidably received in a channel 52 of the casing 21 (FIGS. 5, 8). A spring 48 is engaged on the extension 46 and engaged between the pivot rod 51 and the ear 47 of the casing 21 or between the support 42 and the casing 21 for biasing the barrel 41 away from the barrel 40. A sander member 60 (FIGS. 2, 8) is engaged around the barrels 40, 41 and driven by the motor 27 via the barrel 40 for sanding purposes. The sander member 60 may thus be attached on the casing 21 and may be rotated in concert with the casing 21 about the pivot shaft 22. The handle 50 may move support 42 and the barrel 41 relative to the casing 21 and the barrel 40 for tightening the sander member 60. A fastener 53 is threaded through a flange 54 of the casing 21 (FIGS. 2, 8) and is threaded through the pivot axle 43 for adjusting or securing the pivot axle 43 and the barrel 41 and the support 42 to the casing 21. The fastener 53 may further thread through a flange 56 of the support 42 (FIG. 1). A spring 55 may be engaged on the fastener 53 and engaged with the pivot axle 43 for applying a resilient force between the pivot axle 43 and the fastener 53 or the support 42.

Figure 9:
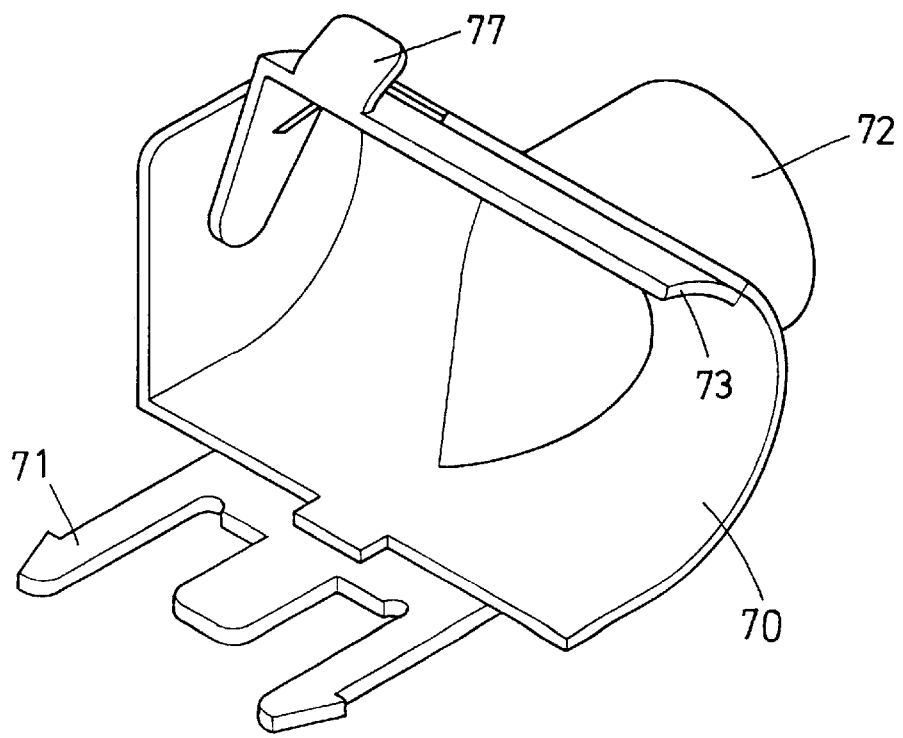
FIG. 9 is a front prespective view of a shielding cap.

A stop 61 is secured to the casing 21 with one or more fasteners 62 and includes an arm 63 extended therefrom. The sander member 60 is slidably received between the casing 21 and the arm 63 which may engage with the work piece and which may retain the work piece relative to the casing 21 for allowing the work piece to be easily machined by the sander member 60. A cover 57 is secured to the casing 21 with a quick release device 58 for covering the support 42 and the barrel 41 and the sander member 60. A cap 70 is provided for shielding a portion of the sander member 60 that is engaged on the barrel 40 (FIGS. 2–5) and includes a latch device 71 (FIG. 9) for engaging with the cover 57 and for securing to the cover 57, and includes a port 72 provided thereon for coupling to a vacuum device which may draw and collect the dust sanded from the work piece. A lid 73 is rotatably secured to the cap 70 at a pivot pin 74 (FIG. 2) with a fastener 76 (FIG. 1), and includes a knob 77 for rotating the lid 73 to shield the barrel 40 (FIGS. 2–5).

In operation, as shown in FIGS. 2 and 5, the casing 21 may be adjusted relative to the housing 14 and the platform 15 to any suitable angular position and may be secured to the base 10 and the housing 14 with the cam 31. Particularly, the sander member 60 may be rotated to a position perpendicular to the platform 15 (FIG. 2) or to a position parallel to or flush with the platform 15 such that the work piece may be easily machined. In addition, as shown in FIG. 8, when the cap 70 is removed from the cover 57, the sander member 60 engaged around the barrel 40 may also be used for sanding the work piece, particularly for sanding the surfaces in the corner areas of the work piece. The table 36 may be secured to the motor 27 for supporting the work piece to be machined by the sander member 60 that is engaged around the barrel 40.

Accordingly, the sander in accordance with the present invention includes a sander member adjustable to various angular positions for facilitating the sanding operation to the work pieces.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A sander comprising:
    a base including a platform secured thereon for supporting a work piece,
    a casing rotatably secured to said base at a pivot shaft, said casing including a plate extended therefrom and having a curved slot formed therein,
    a sander member engaged on said casing and rotatable in concert with said casing about said pivot shaft for sanding the work piece, and
    means for securing said casing to said base at selected angular positions, said securing means including a lock device engaged through said curved slot of said plate to lock said Plate to said base, said lock device including a Pole extended from said base and slidably received in said curved slot of said plate, and a cam device pivotally secured to said Pole and engaged with said plate for securing said plate to said base.

2. The sander according to claim 1, wherein said casing includes a first barrel and a second barrel rotatably secured thereon, said sander member is engaged around said first and said second barrels.

3. The sander according to claim 4 further comprising means for driving said sander member.

4. The sander according to claim 3, wherein said driving means includes a motor secured to said plate and having a spindle secured to said first barrel.

5. The sander according to claim 4, wherein said casing includes a support for rotatably supporting said second barrel.

6. The sander according to claim 5 further comprising means for moving said support and said second barrel relative to said casing to tighten said sander member.

7. A sander comprising:
    a base including a platform secured thereon for supporting a work piece,
    a casing rotatably secured to said base at a pivot shaft, said casing including a first barrel and a second barrel rotatable secured thereon,
    a sander member engaged on said casing and engaged around said first and said second barrels and rotatable in concert with said casing about said pivot shaft for sanding the work piece,
    means for securing said casing to said base at selected angular positions,
    means for driving said sander member, said driving means including a motor secured to said plate and having a spindle secured to said first barrel, and
    a table secured to said motor and provided beside said first barrel.

8. A sander comprising:
    a base including a platform secured thereon for supporting a work piece,
    a casing rotatably secured to said base at a pivot shaft,
    a sander member engaged on said casing and rotatable in concert with said casing about said pivot shaft for sanding the work piece,
    means for securing said casing to said base at selected angular positions, and
    a stop secured to said casing and engaged over said sander member for engaging with the work piece.

9. A sander comprising:

a base including a platform secured thereon for supporting a work piece, a casing rotatably secured to said base at a pivot shaft, a sander member engaged on said casing and rotatable in concert with said casing about said pivot shaft for sanding the work piece, means for securing said casing to said base at selected angular positions, and a cover secured to said casing for shielding said first and said second barrels.

10. The sander according to claim 9, wherein said cover includes a cap detachably secured thereto for shielding said first barrel.

11. The sander according to claim 10, wherein said cover includes a lid rotatably secured to said cap for shielding said first barrel.

* * * * *